No. 857,604. PATENTED JUNE 25, 1907.
J. DAIN.
HAY PRESS.
APPLICATION FILED NOV. 2, 1905.
2 SHEETS—SHEET 1.
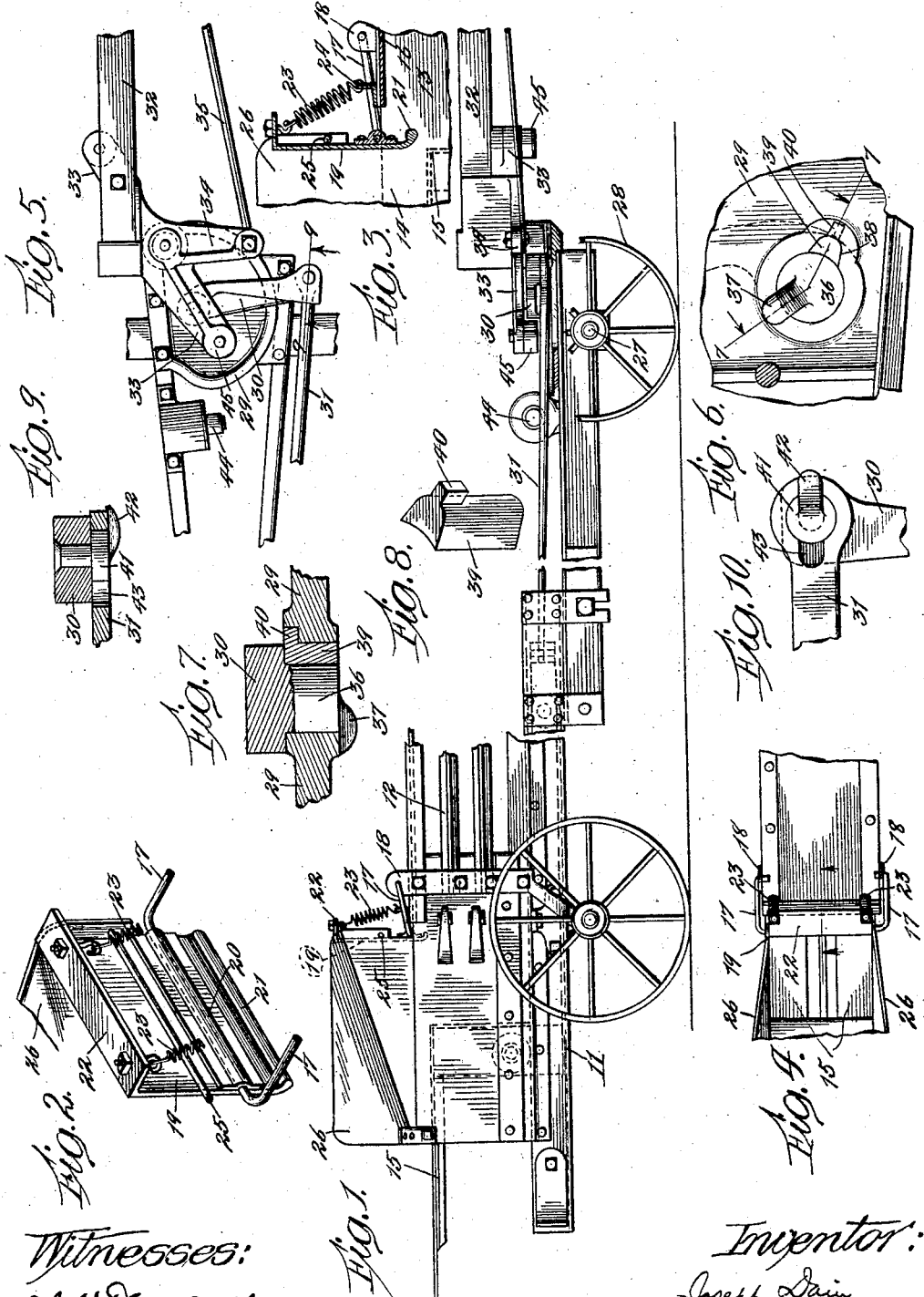

No. 857,604. PATENTED JUNE 25, 1907.
J. DAIN.
HAY PRESS.
APPLICATION FILED NOV. 2, 1905.
2 SHEETS—SHEET 2.
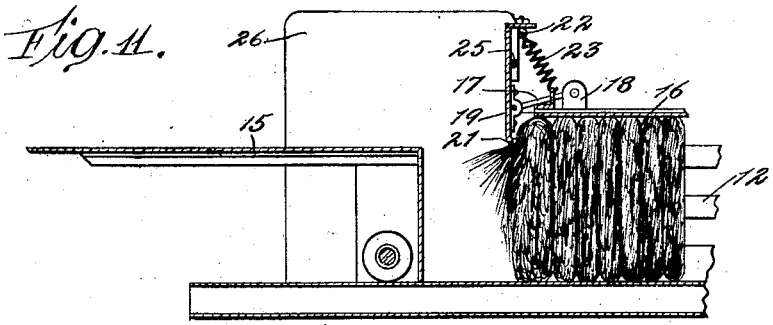
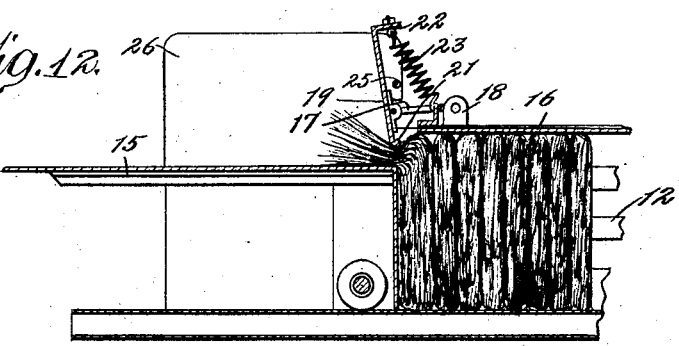
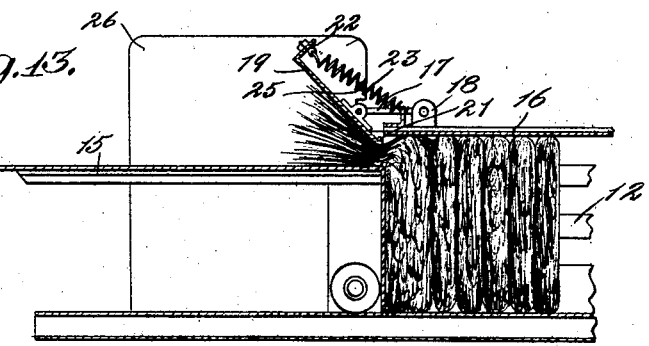

UNITED STATES PATENT OFFICE.

JOSEPH DAIN, OF OTTUMWA, IOWA.

HAY-PRESS.

No. 857,604.

Specification of Letters Patent.

Patented June 25, 1907.

Application filed November 2, 1905. Serial No. 285,593.

*To all whom it may concern:*

Be it known that I, JOSEPH DAIN, a citizen of the United States, residing at Ottumwa, in the county of Wapello and State of Iowa, have invented certain new and useful Improvements in Hay-Presses, of which the following is a specification, reference being had to the accompanying drawings.

My invention relates to hay presses, and has for its object to provide certain improvements which will be hereinafter particularly pointed out. Such improvements relate to the means for tucking in the ends of the hay which project when the plunger is retracted, and to the connections between the devices for actuating the plunger and the mechanism for reciprocating the same.

What I regard as new is set forth in the claims.

In the accompanying drawings,—Figure 1 is a side view of a hay press, some parts being omitted; Fig. 2 is a perspective view of my improved tucker; Fig. 3 is a partial longitudinal sectional view of a hay press, showing my improved tucker; Fig. 4 is a plan view thereof; Fig. 5 is a plan view of a part of the operating mechanism; Fig. 6 is an under-side view of certain of the parts illustrated in Fig. 5; Fig. 7 is an inverted section on line 7—7 of Fig. 6; Fig. 8 is a perspective view of the bearing block; Fig. 9 is a section on line 9—9 of Fig. 5; Fig. 10 is an under-side view of the parts shown in Fig. 9; Fig. 11 is a sectional view, showing the normal position of the tucker; and Figs. 12 and 13 are similar views, illustrating its operation.

My present invention consists primarily in a tucker so mounted with relation to the baling case or chamber and the compressing mechanism that the inwardly-projecting portion thereof moves rearwardly with the plunger as the latter recedes, and at the same time moves inward, thereby very efficiently tucking the projecting ends of the hay down so that when the next succeeding charge is introduced and compressed there are no loose ends of hay between successive charges. To secure this operation the tucker is pivotally mounted so that it may rock on a transverse axis, so as to move the inwardly-projecting end longitudinally of the press, and at the same time the tucker is arranged to be movable bodily in and out relatively to the baling chamber. Usually and preferably the tucker is mounted on the top of the baling case, but I do not restrict myself to so mounting it. In the best embodiment of my invention the tucker is pivotally mounted on suitable pivots preferably formed by the rear portion of a bail, the forward end portion of which is pivoted upon the top of the baling case. The bail is of such length that the tucker is supported at the forward edge of the feed opening with its lower edge or lip projecting into the baling chamber, and the parts are so adjusted that the lower edge of the lip normally lies slightly above the upper surface of the plunger. Suitable springs and stops are provided for restoring the tucker to its normal or upright position.

Referring to the drawings for a more particular description of this feature of my invention,—11 indicates the frame of the press; 12 the baling case; 13 the baling chamber; 14 the feed opening; and 15 the plunger,—all of which are of the usual construction.

16 indicates the top of the baling case.

17 indicates the bail, which is pivoted, preferably to suitable lugs 18 on the top of the baling case and projects rearwardly therefrom, as shown in Fig. 3.

19 indicates the tucker, which, as shown in Fig. 2, is in the form of a plate which extends transversely of the baling case and is pivoted upon the rear portion of the bail 17. A plate 20, as shown in Fig. 2, serves to secure the tucker 19 to the bail 17.

21 indicates the tucking edge or lip of the tucker 19, which is preferably curved forward slightly, as shown in Figs. 2 and 3, and projects down into the baling case at the forward edge of the feed opening. The lower edge of the lip 21 lies slightly above the upper surface of the plunger 15, so as not to interfere with the free movement thereof.

22 indicates a flange at the upper edge of the tucker 19, to which are connected springs 23, as shown in Figs. 2 and 3. Said springs extend forward and downward, and are connected in any suitable way, as by lugs 24, with the top of the baling case, so that they serve to draw the upper portion of the tucker 19 forward.

25 indicates a crossbar or rod, the ends of which are secured to the side boards 26 at the opposite sides of the feed opening, as shown in Figs. 2 and 3. Said rod 25 serves as a stop to limit the forward movement of the upper portion of the tucker, so that the springs 23 cannot move it beyond approximately a vertical position.

In compressing, the plunger 15 moves to the right as shown in Fig. 1, forcing the hay in advance of it into the baling chamber. As the plunger advances and the hay becomes more dense its pressure upon the lip 21 moves said lip forward with the hay to a greater or less extent, and when the plunger approaches the lip 21 of the tucker said lip is forced upward as well as forward by means of the hay which lies between it and the plunger. When the plunger is withdrawn the springs 23 immediately force the tucker inward and at the same time pull the upper portion of the tucker forward thereby throwing the lip backward. In this way the projecting ends of the hay are pressed back and down so that they are in proper position to be folded in when the next succeeding charge of hay is compressed. The tucker also assists in returning the plunger after each compression, since the pull of the springs 23 is transmitted to the plunger through the tucker and its lip 21. While said lip does not directly engage the upper surface of the plunger, it engages it indirectly by means of the hay tightly wedged between said parts.

With regard to the operating mechanism for the plunger, my invention has particularly to do with the connecting devices between the plunger and the horse-power mechanism. As shown in Fig. 1, the frame 11 extends forward and is connected with the axle 27 of the front wheels 28, and near its forward ends said frame carries a casting 29 in which is pivoted a swinging link 30 connected by a connecting rod 31 with the plunger. Said link 30 is adapted to swing back and forth through a greater or less arc to reciprocate the rod 31 and plunger, and is operated by means of a sweep 32 carrying operating arms 33 which project at an angle thereto, as shown in Fig. 5.

34—35 indicate braces for the sweep 32.

As best shown in Figs. 6 and 7, the link 30 is provided with a pivot 36 which fits in a suitable bearing in the casting 29, and is provided with a laterally-projecting lug 37 which projects beyond the bearing of the said pivot under the adjacent portion of the casting 29, as shown in Fig. 6. As also shown in Fig. 6, the bearing of the pivot 36 is circular, except that it is provided at one side with a recess 38, of such shape as to permit of the passage of the lug 37 when the pivot 36 is inserted in its bearing. Preferably the outer portion of the lug 37 is rounded, and the recess 38 is consequently made semi-circular, but this is not essential. In order to fill up the recess 38 and furnish a continuous bearing for the pivot 36, I provide a bearing-block 39 shaped to conform to said recess,—its inner surface being curved in the arc of a circle of the same diameter as the pivot 36, so that when said block is in place a continuous semicircular bearing surface is provided for said pivot. To hold said block in place it is provided at one side with a projecting lug 40, which fits into a suitable recess provided in the upper surface of the casting 29, as shown in Fig. 7, and indicated by dotted lines in Fig. 6. The link 30 does not swing entirely around, and the lug 37 is so placed that under normal working conditions it never registers with the block 39, consequently the pivot 36 can never jump out of its bearing. The block 39 cannot become displaced under such conditions because, as shown in Fig. 7, it is overlapped by the link 30. To remove the link, it is swung far enough to bring the lug 37 into register with the block 39, when the link and said block may be removed together.

In Figs. 9 and 10 I have shown a somewhat similar arrangement for connecting the link 30 with the connecting-rod 31,—there being a pivot 41 carried by the outer end of the link and having a lug 42 projecting under the rear portion of the connecting-rod 31. The lug 42 may be inserted through a recess 43. If desired, a block may be employed for this connection also.

44 indicates a bumper, against which the outer end of the link 30 strikes when the plunger rebounds at the end of each stroke.

Instead of actuating the link 30 by the operating mechanism shown, any other suitable means may be employed. In the construction shown the arms 33 carry rollers 45, which engage the operating edge of the link 30 as the arms rotate and force it backward until said rollers run off the end of said link and thereby release it so that the plunger is permitted to rebound under the elasticity of the hay.

So far as I am aware, no one has heretofore employed a tucker having the movement hereinbefore described, and I therefore claim such construction broadly. In other respects also my invention is not restricted to the construction illustrated and described, except in so far as particularly claimed.

That which I claim as my invention and desire to secure by Letters Patent is,—

1. In a hay-press, the combination of a baling case, compressing mechanism, a tucker, means supporting the tucker so that it may move inwardly and outwardly relatively to the baling case and may rock longitudinally thereof, and a spring for returning said tucker to its normal position.

2. In a hay-press, the combination of a baling case, a plunger, a tucker pivotally mounted on a swinging support and coöperating with the plunger, and a spring for returning said tucker to its normal position upon the withdrawal of the plunger.

3. In a hay-press, the combination of a baling case, compressing mechanism, a tucker coöperating therewith, means pivotally supporting said tucker between its ends so that it may rock longitudinally of the press, and a spring for returning said tucker to its normal position.

4. In a hay-press, the combination of a baling case, compressing mechanism, a tucker coöperating therewith, swinging means pivotally supporting said tucker between its ends so that it may rock longitudinally of the press, and a spring for returning said tucker to its normal position.

5. In a hay-press, the combination of a baling case, a plunger, a swinging support mounted on the baling case, a tucker pivotally mounted on said swinging support and adapted to project into the baling case, and a spring for returning said tucker to its normal position upon the withdrawal of the plunger.

6. In a hay-press, the combination of a baling case, a plunger, a swinging support mounted on the baling case, a tucker pivotally mounted between its ends on said swinging support and adapted to project into the baling case, and a spring for returning said tucker to its normal position upon the withdrawal of the plunger.

7. In a hay-press, the combination of a baling case having a feed opening, a plunger movable in said case under said feed opening, a tucker arranged transversely of the press adjacent to the forward edge of the feed opening and adapted to project into the baling case, means pivotally supporting said tucker so that it may rock longitudinally of the press, and a spring for rocking said tucker upon its pivot to return it to its normal position after operation.

8. In a hay-press, the combination of a baling case, compressing mechanism, a tucker adapted to coöperate with said compressing mechanism, said tucker being movable inwardly and outwardly relatively to the baling case and being arranged to rock longitudinally of the press, and a spring for rocking said tucker to return it to its normal position.

9. In a baling-press, the combination of a baling case, a plunger, a tucker pivotally mounted so that it may rock longitudinally of the baling case, said tucker being inwardly and outwardly movable and having a lip arranged to move forward with a charge of hay as it is carried forward by the plunger, and means for rocking said tucker to move said lip backward and inward as the plunger recedes.

10. In a baling-press, the combination of a baling case, compressing mechanism, a tucker having a lip projecting into the baling case, means supporting said tucker so that said lip may move longitudinally of the baling case as well as inwardly and outwardly relatively thereto, and means for returning said tucker to its normal position when said compressing mechanism returns to its normal position.

11. In a baling-press, the combination of a baling case, a plunger, and spring-actuated means supported by the baling case independently of the plunger and operating to exert backward pressure upon the plunger during part of the return stroke thereof.

12. In a baling-press, the combination of a baling case, a plunger, a pivotally-mounted tucker having an edge portion projecting into the baling case and adapted to swing forward above the plunger as the latter advances, and means for moving said inner edge backward as the plunger is withdrawn.

13. In a baling-press, the combination of a baling case, a plunger, a swinging support, a tucker pivotally carried by said swinging support and movable outwardly and inwardly relatively to the baling case, said tucker having a lip projecting into the baling chamber and movable forward over the fresh charge of hay and the plunger as the hay is compressed, and means for moving said lip backward and inward when the plunger recedes to tuck down the projecting ends of hay.

14. In a baling-press, the combination of a baling case, a plunger, a swinging link for actuating said plunger, a connection between said link and said plunger, a pivot for said link, a laterally-projecting lug carried by said pivot, a bearing for said pivot having a recess for the passage of the lug, and a block fitted in said recess.

15. In a baling-press, the combination of a baling case, a plunger, a swinging link for actuating said plunger, a connection between said link and said plunger, a pivot for said link, a laterally-projecting lug carried by said pivot, a bearing for said pivot having a recess for the passage of the lug, and a block fitted in said recess, said lug being out of alinement with said recess during the normal operation of said link.

16. In a baling-press, the combination of a baling case, a plunger, a swinging link for actuating said plunger, a connection between said link and said plunger, a pivot for said link, a laterally-projecting lug carried by said pivot, a bearing for said pivot having a recess for the passage of the lug, and a block fitted in said recess, said lug being out of alinement with said recess during the normal operation of said link, said link being arranged to overlap said block.

17. In a baling-press, the combination of a baling case, a plunger, a swinging link for actuating said plunger, a connection between said link and said plunger, a pivot for said link, a laterally-projecting lug carried by said pivot, a bearing for said pivot having a recess for the passage of the lug, and a block fitted in said recess, said lug being out of alinement with said recess during the normal operation of said link, said block having a projecting lug.

JOSEPH DAIN.

Witnesses:
 JOHN L. JACKSON,
 MINNIE A. HUNTER.